United States Patent
Good et al.

(10) Patent No.: US 6,358,002 B1
(45) Date of Patent: Mar. 19, 2002

(54) ARTICLE HAVING DURABLE CERAMIC COATING WITH LOCALIZED ABRADABLE PORTION

(75) Inventors: Randall Richard Good, Acton, ME (US); George Everett Foster, Dudley, MA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/371,250

(22) Filed: Aug. 10, 1999

Related U.S. Application Data

(63) Continuation-in-part of application No. 09/100,180, filed on Jun. 18, 1998, now abandoned.

(51) Int. Cl.$^7$ .......................... F01D 11/00; F03B 11/00
(52) U.S. Cl. ................................................... 415/174.4
(58) Field of Search .......................... 415/173.4, 174.4

(56) References Cited

U.S. PATENT DOCUMENTS

| | | | |
|---|---|---|---|
| 3,843,278 A | 10/1974 | Torell | |
| 3,975,165 A | * 8/1976 | Elbert et al. | 415/173.5 X |
| 4,209,348 A | 6/1980 | Duhl et al. | |
| 4,269,903 A | * 5/1981 | Clingman et al. | 415/173.4 X |
| 4,289,446 A | * 9/1981 | Wallace | 415/173.3 |
| 4,422,648 A | * 12/1983 | Eaton et al. | 415/173.4 X |
| 4,460,185 A | 7/1984 | Grandey | |
| 4,536,127 A | 8/1985 | Rossmann et al. | |
| 4,566,700 A | * 1/1986 | Shiembob | 415/173.4 X |
| 4,719,080 A | 1/1988 | Duhl et al. | |
| 4,936,745 A | 6/1990 | Vine et al. | 415/173.4 |
| 5,073,433 A | 12/1991 | Taylor | |
| 5,520,516 A | 5/1996 | Tayler et al. | |
| 5,536,022 A | 7/1996 | Sileo et al. | |
| 5,705,231 A | 1/1998 | Nissley et al. | 427/453 |
| 5,780,171 A | * 7/1998 | Nissley et al. | 428/629 |
| 5,823,739 A | 10/1998 | Van Duyn | |
| 6,102,656 A | * 8/2000 | Nissley et al. | 415/174.4 |

* cited by examiner

Primary Examiner—John E. Ryznic
(74) Attorney, Agent, or Firm—F. Tyler Morrison

(57) ABSTRACT

An air seal is illustrated as used in a gas turbine engine. The seal includes at least a seal substrate, a relatively dense, erosion resistant ceramic layer applied over the bond coat, and an abradable ceramic layer applied in a local area over the dense ceramic layer. The abradable ceramic interacts with a component moving relative to the seal, such as a turbine blade that moves relative to the seal, and cooperates with the moving component to provide sealing and thermal insulation.

21 Claims, 2 Drawing Sheets

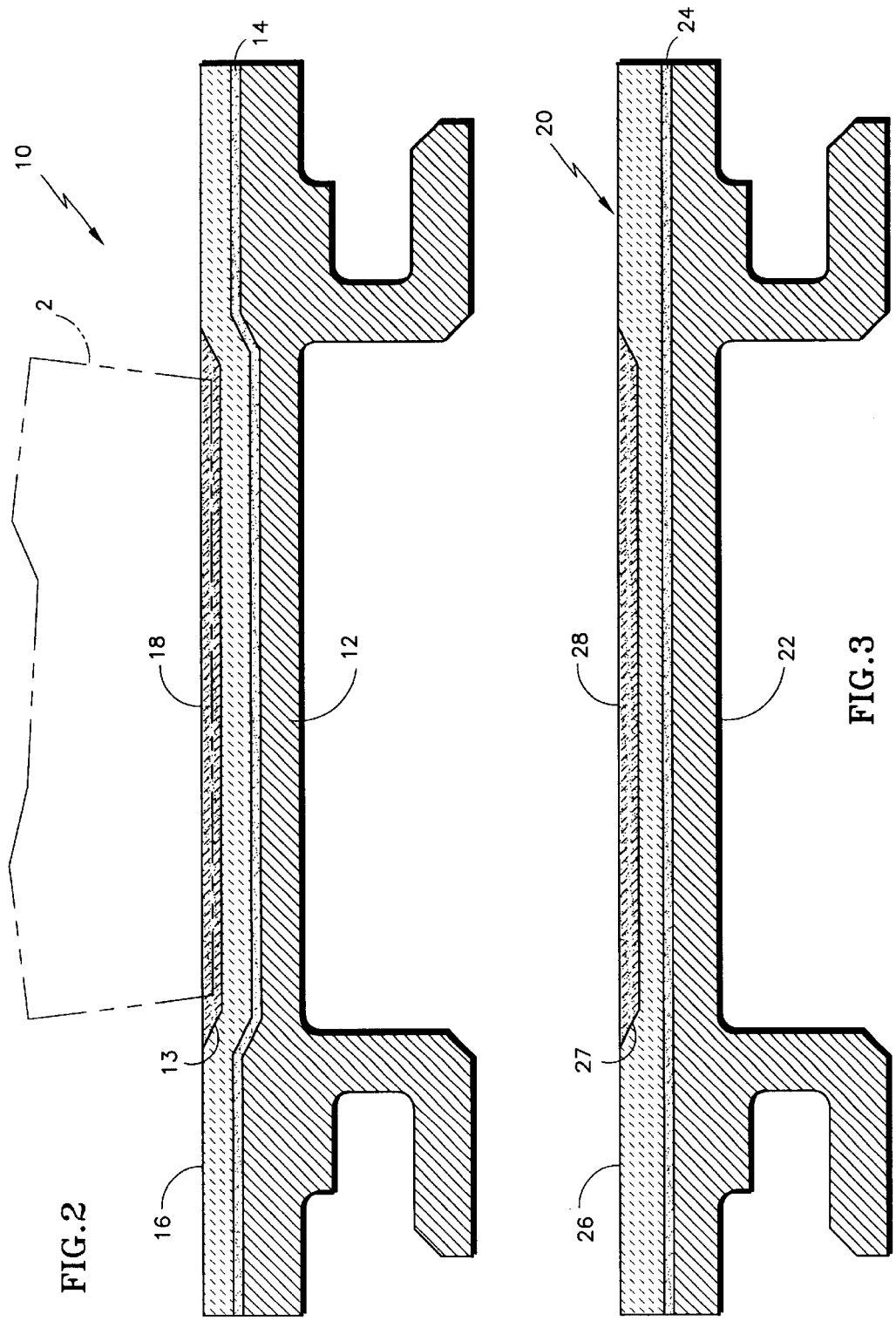

ARTICLE HAVING DURABLE CERAMIC COATING WITH LOCALIZED ABRADABLE PORTION

This is a continuation in part application of Ser. No. 09/100,180 filed on Jun. 18, 1998 now abandoned, entitled "ARTICLE HAVING DURABLE CERAMIC COATING WITH LOCALIZED ABRADABLE PORTION".

BACKGROUND OF THE INVENTION

The present invention relates generally to ceramic coatings for use in gas turbine engines, and more particularly to ceramic coatings which provide sealing and thermal insulation.

Gas turbine engines are well known sources of motive power, e.g., for aircraft, and generally include compressor, combustor and turbine sections. As illustrated generally in FIG. 1, compressor and turbine sections each include shaft-mounted, rotating disks 1, each carrying a set of blades 2 located within a hollow housing or case 3, with intervening sets of stationary vanes 5 mounted to the case. Air seals 4, 7 are provided between the tips of the blades and the case, and between the vanes and the disks to prevent air leakage between those components.

Air is ingested through an engine inlet and compressed by rotating disks and associated blades in the compressor. The compressed air is then burned with fuel in the combustor to generate high pressure and temperature gasses, which cause rotation of the turbine sections and associated fan compressor stages and are then ejected out an engine exhaust to provide thrust. The case is intended to prevent leakage of air or combustion products around the tips of the blades, i.e., between the blade tips and the case, which leakage reduces the efficiency of the engine.

Despite the design of components to minimize leakage, a substantial proportion of any leakage which does occur in a normally-operating gas turbine engine occurs between the tips of the blades and the case, and between the tips of the vanes and the disks. One manner of eliminating such leakage is to fabricate all mating parts to extremely close tolerances, which becomes increasingly expensive as tolerances are reduced. Moreover, given the temperature ranges to which the parts are exposed before, during and after operation, and the resultant thermal expansion and contraction of the parts, such close tolerances would likely result in interference between mating parts and corresponding component wear and other damage. Accordingly, gas turbine engine designers have devoted significant effort to developing effective air seals, and particularly seals composed of abradable materials. See, e.g., U.S. Pat. Nos. 4,936,745 to Vine et al. and 5,706,231 to Nissley et al., which are assigned to the assignee of the present invention and expressly incorporated by reference herein. Such seals require a balance of several properties including abradability upon being contacted by a rotating blade tip, erosion resistance, durability, thermal expansion balanced with that of the underlying material, and relative ease and reasonable cost of manufacture. See, e.g., U.S. Pat. No. 5,536,022 to Sileo, which is also assigned to the assignee of the present invention and expressly incorporated by reference herein. To the extent that the seal is employed at elevated temperatures, the seal material must also be stable over a relatively wide temperature range and thermally insulate the underlying substrate.

A typical abradable air seal is described in U.S. Pat. No. 4,936,745 to Vine et al. The seal includes a metallic bond coat, e.g., a MCrAlY or aluminide bond coat, and a porous ceramic abradable layer, such as yttria stabilized zirconia (YSZ) having a controlled amount of porosity. Due to the porous, relatively soft structure of the YSZ layer, the material erodes not only upon contact by rotating blade tips, but also upon exposure to gasses at elevated velocities, pressures and temperatures, and upon contact by any particulate material entrained in the gasses. Erosion of the abradable material reduces thickness of the layer, which results in a gap and leakage between the blade tips and the case, and the vane tips and the disks, as well and also reduces the thermal insulation provided by the layer. To the extent that erosion extends through the ceramic layer, the underlying substrate is thermally protected only by the bond coat and whatever cooling air is provided to the seal. Accordingly, designers must either provide cooling for the seal, in an amount corresponding to an assumed absence of the ceramic material, or specify that the related structure, e.g., the seal, be removed and the ceramic material replaced after a relatively short service life. While known abradable materials provide effective sealing, it is desirable to provide seals having enhanced erosion resistance and correspondingly enhanced service lives.

It is an object of the present invention to provide a seal with enhanced erosion resistance, which maintains good abradability.

It is a further object of the present invention to provide a seal which provides significant thermal insulation to the underlying seal substrate, even if an abradable portion of the seal erodes or fails.

SUMMARY OF THE INVENTION

According to the present invention, a seal is disclosed which has particular use in a gas turbine engine. For example, the seal may serve as an air seal in compressor or turbine sections of the engine, and cooperate with a set of rotating blades of a section.

The seal includes a seal substrate or shoe, which is typically formed from a superalloy material. An adherent alumina layer of the seal is formed over the over the substrate, and may be formed as part of a bond coat that is a MCrAlY bond coat or an aluminide bond coat.

A relatively dense and erosion resistant ceramic layer is applied over the alumina layer. The seal also includes a porous abradable ceramic layer applied over a portion of the erosion resistant ceramic layer, and corresponds to an area in which the seal interacts with a cooperating part, such as a set of rotating turbine blades. The abradable ceramic layer thus cooperates with the blade tips to provide the sealing.

An advantage of the present invention is that the seal incorporates abradable material only where the seal cooperates with a mating component, such as the blade tips, to provide good sealing between the blades and the seal. An underlying layer of dense ceramic material provides enhanced erosion resistance and durability in addition to the thermal insulting capability of the ceramic material.

Additional advantages will become apparent to those skilled in the art in view of the following detailed description and attached drawings.

BRIEF DESCRIPTION OF THE DRAWINGS

FIG. 2 is a sectional view of an outer air seal incorporating the present invention.

FIG. 3 is a view similar to FIG. 2, but illustrates another embodiment of the present invention.

DETAILED DESCRIPTION OF THE PREFERRED EMBODIMENTS

Figure 1:
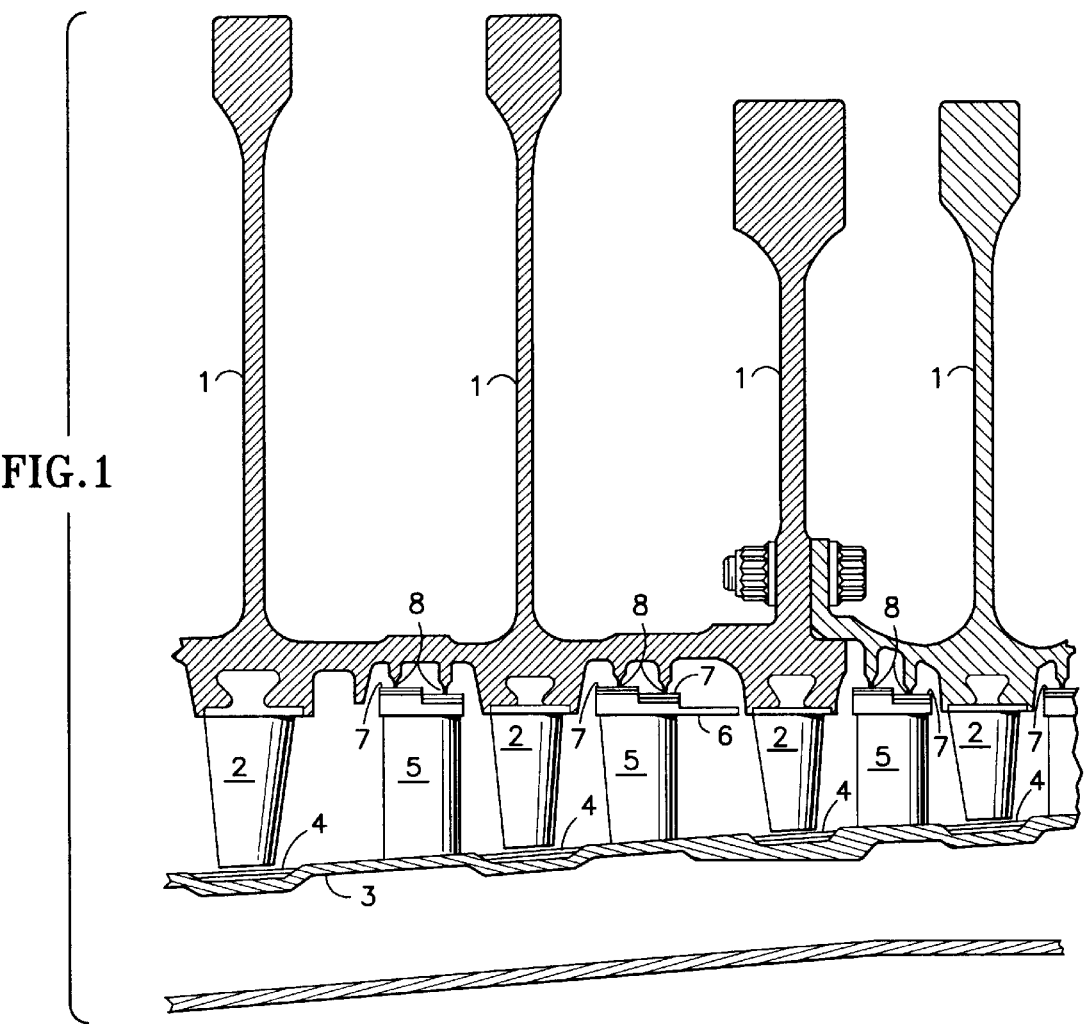
FIG. 1 is a cross sectional view of a portion of a typical gas turbine engine.

Turning now to FIG. 2, a blade outer air seal 10 incorporating the present invention includes a metal shoe 12, an adherent alumina layer 14 which may be formed as part of a bond coat, a dense erosion resistant ceramic layer 16, and an abradable ceramic material applied to a local area 18 of the seal. The illustrated seal 10 is incorporated into a gas turbine engine (FIG. 1) for example in either a compressor or turbine stage. Particularly in a turbine stage, or later compressor stage, the ceramic materials are preferably also thermally insulating. In FIGS. 1 and 2 the seal is used in conjunction with a rotating blade 2 that typically includes an abrasive material (not shown) applied to the blade tip, as is known in the art, e.g., from U.S. Pat. No. 4,936,745 to Vine et al., which is expressly incorporated by reference herein. The abradable ceramic and the blade tip interact in an area referred to as a blade rub zone, which is at least partially co-extensive with the local area in which the abradable ceramic is applied. Those skilled in the art will recognize that the present invention may be incorporated into other types of engines and in other applications with equal effect, and the present is not intended to be limited to gas turbine engines.

The shoe 12 of the seal 10 is usually fabricated from a superalloy material, particularly where the seal is positioned in a higher temperature portion of the engine such as a late compressor stage or a turbine stage. Typical superalloys employed for this purpose include nickel-, cobalt- and iron-base alloys. The shoe 12 may or may not include a recess or trench 13 (compare FIGS. 2 and 3) located proximate the area in which blade tips 2 (one shown in FIG. 2) interact with the seal.

As noted above, the seal is provided to prevent or at least minimize leakage between the tips of the blades and the surrounding engine case. The seal material must abrade upon contact by a cooperating component such as a rotating blade tip, be erosion resistant, thermally expand at a rate corresponding to that of the shoe and related materials, and the seal must be manufacturable at a reasonable cost. Depending upon where the seals are employed within a gas turbine engine, the seals may be exposed to high gas temperatures, and accordingly the seal material should also thermally insulate the underlying shoe from the high temperature gasses. In the absence of sufficient thermal protection, the temperatures are high enough to promote significant creep, oxidation or possibly even melting of the metal. Preferably but not necessarily, the dense ceramic has a thermal conductivity less than about 10–15 Btu-in./ft$^2$-hr.-°F., and the abradable ceramic has a thermal conductivity of less than about 3–10 Btu-in./ft$^2$-hr.°F.

An alumina layer 14 is formed on the metal substrate 12, and facilitates and enhances the adherence of ceramic material applied to the shoe. Preferably but not necessarily, the alumina layer 14 is formed along the entire surface of the seal that will be exposed to hot gasses, and is formed as part of a metallic bond coat such as a MCrAlY or an aluminide bond coat or another bond coat capable of providing an adherent alumina layer. When a MCrAlY bond coat is used, the bond coat is applied along the shoe 12, for example by plasma spraying and more preferably by low pressure plasma spraying. Aluminide bond coats may be applied, for example, by pack aluminizing or by chemical vapor deposition processes. See, e.g., the above-mentioned, commonly-owned U.S. Pat. No. 4,936,745 to Vine et al. Since some ceramic coatings are relatively transparent to oxygen and to corrosive debris, the bond coat also provides oxidation and corrosion resistance for the shoe, and also provides some thermal insulation of the shoe in the event that the overlying ceramic material fails. As is known, an alumina layer is formed on some superalloys without applying a separate bond coat, and these alloys may also be employed with the present invention. See, e.g., commonly-owned U.S. Pat. Nos. 4,209,348 and 4,719,080 both to Duhl et al., which are expressly incorporated by reference herein.

The dense, erosion resistant layer 16 of ceramic material is then applied, preferably along the entire alumina layer 14, i.e., corresponding to the portion of the seal that will be exposed to hot gasses. The layer 16 is applied to a thickness of preferably up to about 75 mils, more preferably up to a uniform thickness of about 50 mils. The dense ceramic layer provides erosion resistance, e.g., against the hot, pressurized gasses in the gas path and any particulate matter entrained in the gasses, and also thermally insulates the underlying seal shoe from the high temperature gasses. The dense ceramic material may be applied by plasma spraying, HVOF or any other suitable process.

While various ceramics may be incorporated into the dense ceramic layer of the present invention with satisfactory results, we prefer to use a segmented abradable ceramic (SAC) coating, similar to but differs significantly from that shown and described in commonly owned U.S. Pat. No. 5,705,231 to Nissley et al., which is expressly incorporated by reference herein. The present SAC coating includes a zirconia-based base layer with a thickness of up to about 35 mils (preferably between about 10–20 mils), as well as a graded interlayer with a thickness of up to about 2–25 mils (preferably between about 4–8 mils). The composition of the interlayer is preferably a combination of the base layer and the abradable layer. Adjacent to the base layer, the interlayer composition corresponds generally to that of the base layer; adjacent to the abradable layer, the interlayer composition corresponds generally to the outer layer. As its name suggests, the interlayer has a composition that is graded between the composition of the base layer and the outer layer. The outer layer of Nissley is not utilized in the present invention. Rather, the abradable ceramic 18 is applied only to a localized area, such that the interlayer is generally exposed.

The base layer is composed of a material including ceria stabilized zirconia, magnesia stabilized (sometimes referred to as strengthened) zirconia, calcia stabilized zirconia or yttria stabilized zirconia (YSZ), and mixtures thereof, and is preferably yttria strengthened zirconia, more preferably up to about 35 w/o (weight percent) yttria, preferably between about 5 –35 vol. % and a porosity of up to about 40 vol. %, preferably up to about 35 vol. %.

The dense ceramic layer 16 is preferably plasma sprayed, and applied such that microcracks form in and extend generally through the dense ceramic layer. More preferably, the ceramic layer is also applied to provide the recess or trench 13 either by applying a uniform layer to a shoe that has a pre-existing and corresponding recess or trench (as in FIG. 2) or in a manner discussed below with reference to FIG. 3. Heating the shoe to a temperature of less than about 600° F. during plasma spraying of the dense ceramic material is believed to assist the formation of the microcracks. The microcracks provide the segmented nature of the layer 16. See, e.g., U.S. Pat. No. 5,073,433 to Taylor and U.S. Pat. No. 5,520,516 to Taylor et al., both of which are expressly incorporated by reference herein, and also Nissley.

The abradable ceramic layer 18 is then applied, e.g., to the portion of the seal 10 that interacts with the rotating blade tips 2. While various ceramics may be employed to provide satisfactory results, we prefer to use a porous ceramic such as the ceramic described in commonly-owned U.S. Pat. 4,936,745 to Vine et al. This ceramic material has been successfully used by the assignee of the present invention to provide superior sealing in gas turbine engines between blade or vane tips and cooperating cases or disks. The abradable ceramic layer is preferably composed of a yttria stabilized zirconia with about 6–8 w/o yttria and about 20–35 vol. % porosity. The layer 18 is preferably also applied using conventional plasma spray, and conforms to and fills in the recess. The seal 10 is then machined, if necessary, to desired dimensions and/or to remove any extraneous material, e.g., excess porous ceramic.

FIG. 3 illustrates an embodiment of the present invention incorporating a shoe that does not have a pre-existing trench near the blade rub zone. The seal 20 includes a shoe 22 similar in many respects to the shoe 10, but the shoe 22 defines a planar surface. An alumina layer 24 is formed on the shoe, or a bond coat on which an alumina layer is formed is applied to the shoe 22 surface, in a manner similar to the layer 14 described above. The dense ceramic layer 26 is then applied to the alumina layer 24 in a manner preferably similar to that described above for the layer 16. However, the layer 26 is applied so as to and form a trench 27, into which an abradable layer 28 is subsequently applied. The trench may be formed in the dense ceramic layer, for example by masking an area of the layer 26 during application of the layer 26 or by rapidly traversing the substrate relative to the plasma spray gun in the trench area to deposit material to the areas adjacent to where the trench is to be formed, or by applying a uniform dense ceramic layer and removing material so as to define a trench. The porous ceramic is then applied in the manner described above. However provided, the trench is designed to ensure that the underlying, dense ceramic is not mechanically removed by a cooperating component, e.g., a rotating blade tip removes only the abradable ceramic.

One advantage of the present invention is that the seal incorporates both a relatively durable, thermally-insulating ceramic layer and a local area of relatively abradable material, thereby combining the advantages of both materials. The presence of a durable ceramic layer provides the enhanced erosion resistance of the seal as well as significant thermal insulating capacity of the dense ceramic, thereby reducing cooling requirements for the seal and providing a corresponding efficiency gain. Accordingly, even if the porous, abradable material erodes, there is no need to provide cooling air based upon the assumption that the underlying shoe is exposed. In addition, the present invention provides the abradable material in a localized area, i.e., only where the seal interacts with a cooperating component, such as a set of rotating blade tips, thereby enabling good sealing between the blades and the seal.

As noted above, the present invention may be employed with a conventional bond coat that overlies a substrate, or with substrate materials that form an adherent alumina layer without a separate bond coat. When a uniform dense ceramic layer is provided, the uniform layer provides uniform thermal insulation of the underlying substrate, thereby minimizing thermal gradation along the substrate material. While the above-described embodiment of the present invention has particular utility in the high pressure turbine section of a gas turbine engine, the invention may also be employed in low pressure turbine section or compressor section, or in connection with any unshrouded blades in such an engine.

The seal of present invention provides other advantages over known seals. The incorporation of a durable ceramic layer provides a seal having significantly higher erosion resistance, and thus a longer-lived seal. Incorporating a layer of durable ceramic layer under the abradable ceramic will provide a TBC with a predictable life corresponding to a significant portion of the life of the seal as a whole. As noted above, seals comprising primarily only an abradable ceramic material must provide significant cooling air to the seal, e.g., in an amount corresponding to the assumption that the ceramic has completely eroded. The present seal can be designed with substantially lower cooling air requirements, i.e., the amount of cooling air can be reduced by about 0.2–0.8% of the total airflow through the engine, and thus enables a corresponding improvement in fuel efficiency of about 0.1–0.8%. Such improvement in efficiency is remarkable, given that an improvement of only about 0.1% is considered very significant.

While the present invention has been described above in detailed embodiments, numerous variations and substitutions may be made without departing from the spirit of the invention or the scope of the following claims. Accordingly, it is to be understood that the invention has been described by way of illustration and not by limitation.

What is claimed is:

1. A gas turbine engine air seal comprising:

a seal substrate;

a layer of adherent alumina formed over the substrate;

a layer of durable ceramic material applied to the alumina layer and composed of a base layer applied on the alumina layer and a graded interlayer, the graded interlayer having a composition adjacent to the base layer corresponding to the bond layer and a composition adjacent the abradable ceramic corresponding to the abradable ceramic; and an abradable ceramic material applied to only a local area of the durable ceramic layer; the abradable ceramic material and the durable ceramic material having different compositions.

2. The seal of claim 1, wherein the seal substrate is composed of a material selected from the group consisting essentially of nickel base, cobalt base, iron base superalloys and mixtures thereof.

3. The seal of claim 1, further comprising:

a metallic bond coat applied to the substrate, wherein the alumina layer is formed on the bond coat.

4. The seal of claim 3, wherein the bond coat is a MCrAlY or aluminide bond coat.

5. The seal of claim 1, wherein at least one of the ceramic materials has a thermal conductivity less than 15 Btu-in./ft$^2$-hr.-° F.

6. The seal of claim 1 wherein the durable ceramic is composed of a material selected from the group consisting essentially of ceria stabilized zirconia, magnesia stabilized zirconia, calcia stabilized zirconia, yttria stabilized zirconia and mixtures thereof.

7. The seal of claim 1, wherein the abradable ceramic material has a porosity of between about 20–35 vol. %.

8. The seal of claim 1, further comprising:

a cooperating component supported for movement relative to and interaction with the abradable ceramic material in a rub zone, the abradable ceramic positioned proximate the rub zone.

9. The seal of claim 1, wherein the seal is an outer air seal and defines a gas path surface, and the dense ceramic extends along the entire gas path surface.

10. The seal of claim 1, wherein the dense ceramic layer is applied to a uniform thickness.

11. The seal of claim 1, wherein the dense ceramic defines a recess, the abradable ceramic layer being applied in the recess of the dense ceramic.

12. The seal of claim 11, wherein the abradable ceramic is applied to conform to the recess.

13. The seal of claim 11, wherein the seal substrate defines a recess, the dense ceramic is applied to provide a recess corresponding to the shape of the seal recess.

14. A gas turbine engine seal system comprising:

a seal assembly having a superalloy substrate; an alumina layer on at least a portion of the substrate; an erosion resistant ceramic layer applied to the alumina layer; and an abradable ceramic material applied to only a local area of the erosion resistant ceramic layer, the erosion resistant ceramic composed of a base layer on the alumina layer and a graded interlayer, the graded interlayer having a composition adjacent to the base layer corresponding to the bond layer and a composition adjacent the abradable ceramic corresponding to the abradable ceramic, and the abradable ceramic material and the erosion resistant ceramic material having different compositions; and an engine component adapted for motion relative to the seal assembly and having an abrasive portion interacting with the abradable ceramic layer in a rub zone at least partially coextensive with the local area, the abrasive portion of the component and the abradable ceramic layer of the seal assembly cooperating to provide sealing.

15. The seal system of claim 14, further comprising:

a MCrAlY or aluminide bond coat on the substrate, the alumina layer formed on the bond coat.

16. The seal system of claim 14, wherein the dense ceramic layer includes microcracks.

17. The seal system of claim 14, wherein the abradable ceramic material has a porosity of between about 5–35 vol. %.

18. The seal system of claim 14, wherein the component comprises a rotating blade tip interacting with the seal assembly in a blade rub zone, the abradable ceramic located proximate the blade rub zone.

19. The seat system of claim 14, wherein the dense ceramic defines a recess, the abradable ceramic layer being applied in the recess of the dense ceramic.

20. The seal system of claim 19, wherein the abradable ceramic is applied to conform to the recess.

21. The seal system of claim 19, wherein the seal substrate defines a trench, the dense ceramic is applied so as to define a corresponding recess.

* * * * *